No. 729,517. PATENTED MAY 26, 1903.
A. TINDEL.
ROTARY METAL CUTTING TOOL.
APPLICATION FILED DEC. 6, 1902.
NO MODEL. 3 SHEETS—SHEET 1.
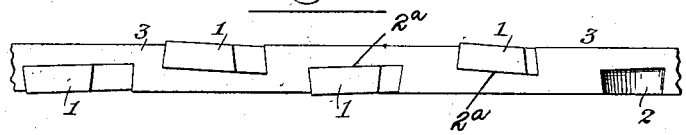
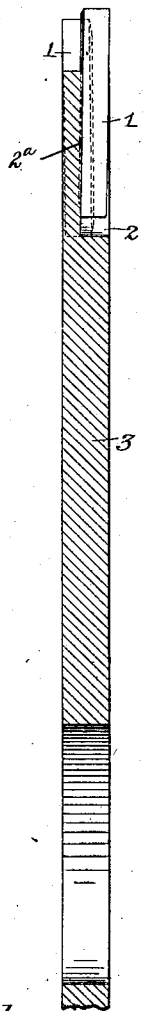
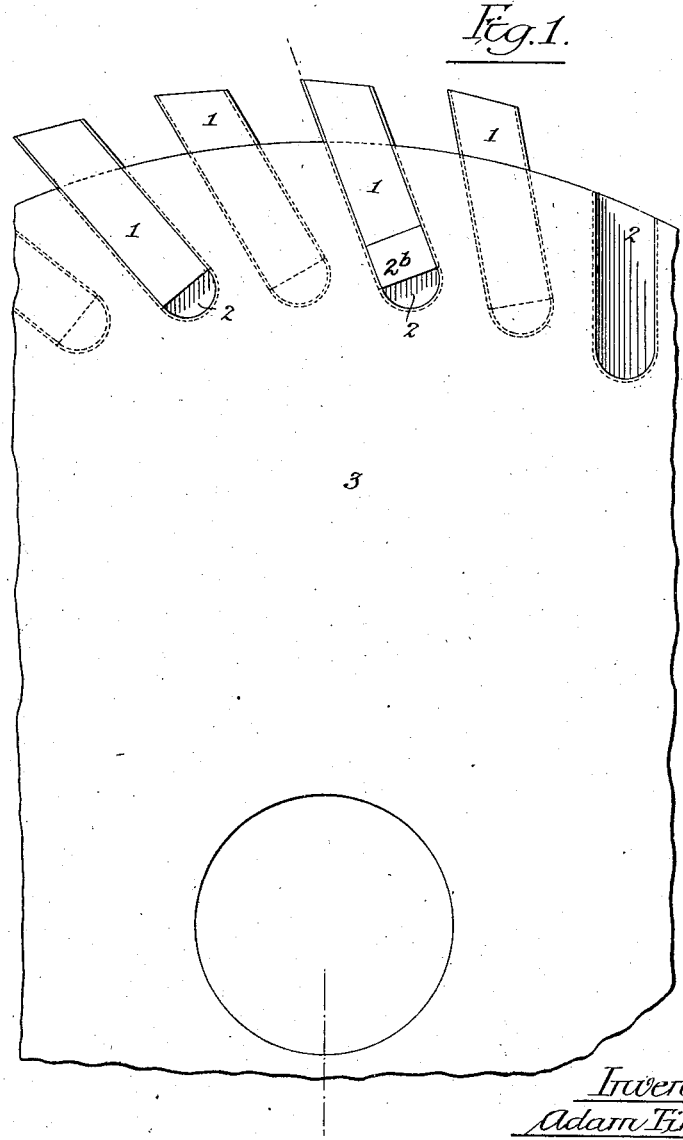
Witnesses:—
Frank L. A. Graham
J. E. Bechtold
Inventor:—
Adam Tindel,
by his Attorneys:

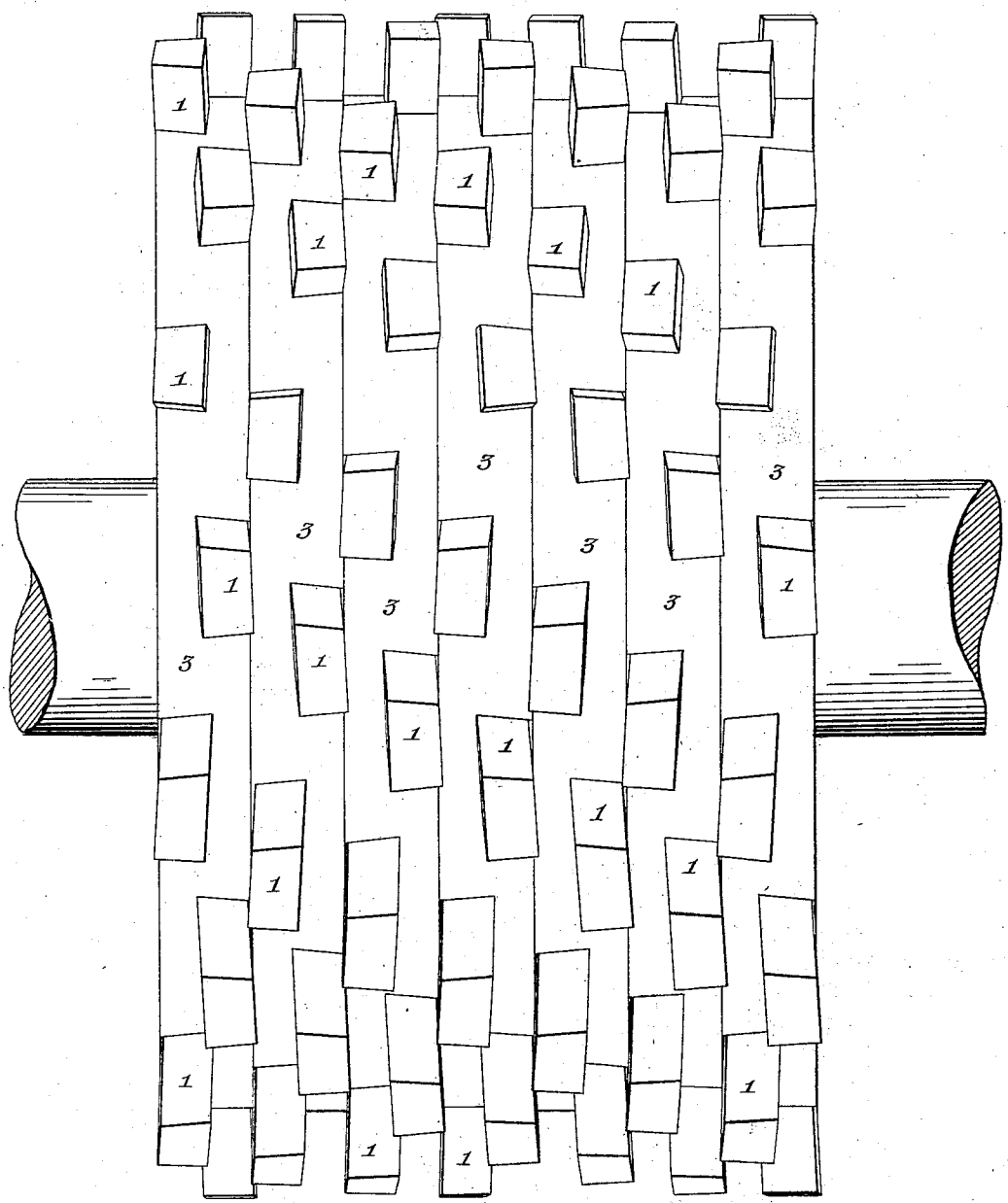

No. 729,517. PATENTED MAY 26, 1903.
A. TINDEL.
ROTARY METAL CUTTING TOOL.
APPLICATION FILED DEC. 6, 1902.
NO MODEL. 3 SHEETS—SHEET 3.
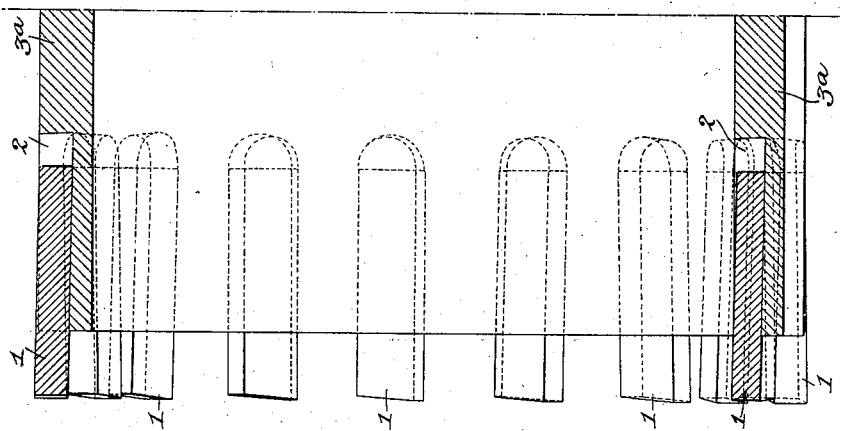
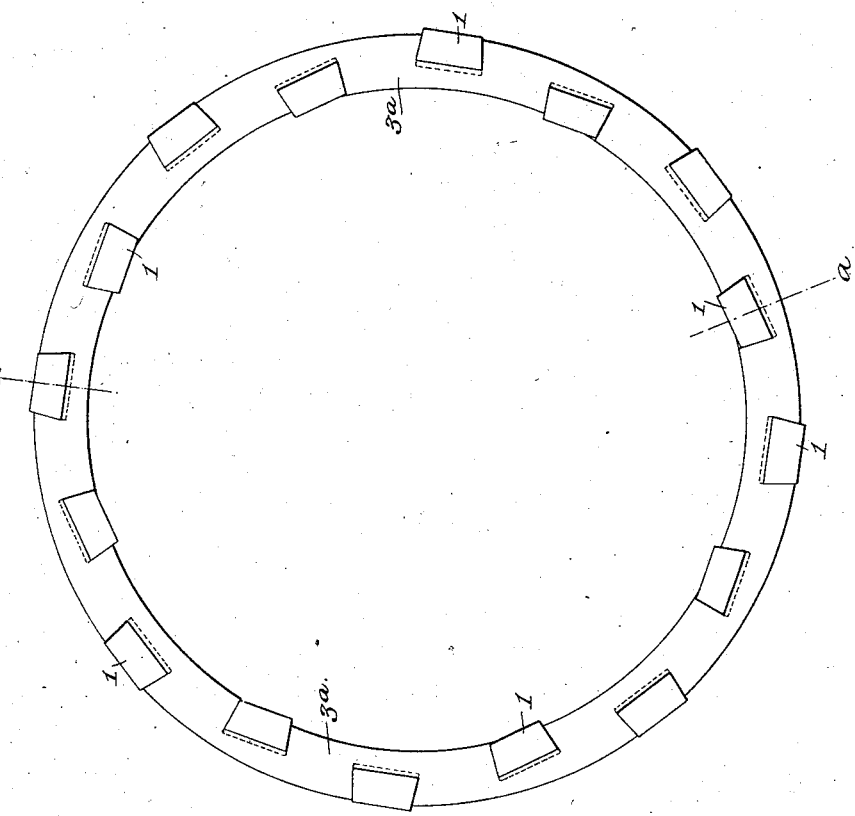
Witnesses:
Frank L. A. Graham
J. E. Bechtold
Inventor:
Adam Tindel,
by his Attorneys,
Howson & Howson No. 729,517. Patented May 26, 1903.

UNITED STATES PATENT OFFICE.

ADAM TINDEL, OF PHILADELPHIA, PENNSYLVANIA, ASSIGNOR TO TINDEL-MORRIS COMPANY, OF EDDYSTONE, PENNSYLVANIA, A CORPORATION OF PENNSYLVANIA.

ROTARY METAL-CUTTING TOOL.

SPECIFICATION forming part of Letters Patent No. 729,517, dated May 26, 1903.

Application filed December 6, 1902. Serial No. 134,120. (No model.)

*To all whom it may concern:*

Be it known that I, ADAM TINDEL, a citizen of the United States, residing in Philadelphia, Pennsylvania, have invented certain Improvements in Rotary Metal-Cutting Tools, of which the following is a specification.

One object of my invention is to so construct rotary saws or other metal-cutting tools as to provide for the ready application or removal of the cutting bits or teeth and by reason of the simple form of the latter to permit of the use of self-hardening steel therefor.

Other objects are to render unnecessary any supplementary fastening or locking appliances for the teeth and to provide between the teeth and the cut made by them proper clearance, so that friction is avoided.

These objects I attain in the manner hereinafter set forth, reference being had to the accompanying drawings, in which—

Figure 1 is a side view of part of a saw with inserted teeth in accordance with my invention. Fig. 2 is a top view of the same. Fig. 3 is a transverse section. Fig. 4 is a plan view of a surface-milling cutter embodying the invention. Fig. 5 is an end view illustrating the application of the invention to an annular cutting-tool; and Fig. 6 is a section on the line *a a*, Fig. 5.

Referring first to the saw, (shown in Figs. 1, 2, and 3,) it will be observed that the cutting bits or teeth 1 each have beveled front and rear edges, Fig. 2, and are inserted into correspondingly-formed slots or sockets 2 in the body 3, which slots are formed in the right and left sides of the body alternately and are of such length that the teeth will project to the desired extent outwardly beyond the periphery of the body, as shown in Fig. 1. Each of the slots is inclined backwardly from the periphery of the body at an angle in respect to a radial line drawn from the center of the body to the periphery, so that the cutting edges of the teeth will have a good cutting angle, and the resistance of the cut will have the effect of forcing the teeth into the slots, thus preventing any loosening or drawing-out of the teeth in the operation of cutting. I have found that if the teeth are set with a backward inclination of twenty degrees no fastening of the same other than the beveling of their edges is necessary to hold them in position, and this elimination of supplementary fastening or locking devices simplifies and cheapens the construction of the tool. The inner walls $2^a$ of the slots 2 are slightly inclined in a lateral direction from a plane parallel with the face of the body outward toward the periphery, as shown in Fig. 2, so as to impart a slight outward pitch or set to the teeth, whereby the cutting ends of the latter project laterally beyond the face of the body. Hence the slot or groove cut by the tool will be slightly wider than the thickness of the body, proper clearance for said body in the cut will be provided, and friction or binding of the body in the cut will be prevented. The inner walls of the slots are also given a slight outward inclination toward the front edge thereof, being set at a slight angle in respect to a line parallel with the face of the body and crossing the narrow dimension or width of the slot, as shown in Fig. 2, whereby only the front portions or forward edges of the teeth will be in contact with the walls of the slot in cutting, thus giving the teeth themselves the necessary side clearance rearward and preventing friction upon them. The slots in the bodies are cut to such length and the teeth are made of such thickness that the inner sides of the teeth on one side of the body overlap the inner sides of those on the other side of the body, so as to insure the removal of all of the metal from the cut. Owing to their rounded inner ends the slots 2 can be readily cut by a rotary milling-tool and a perfectly-true fit of the front and rear faces of the teeth in the slots will be insured. The inner ends of the teeth are, however, cut square, leaving a recess between them and the rounded inner ends of the slots, whereby a drift or other tool can be readily inserted for the purpose of projecting the teeth when they are so worn as to render such operation necessary for further cutting without the inserting of new teeth. In this case the space in the slots 2 left by the projected teeth can be filled with liners or fillers $2^b$ of any suitable material. I am thus enabled to use the teeth until they are practically worn out or are so short that they cannot be retained in the slots. The teeth, owing to their simple form, can be made without any machine cutting or manipulation, a small amount of grinding only being necessary to bevel their edges. By reason of this construction I am enabled to use self-hardening steel for the teeth and can make heavier cuts and employ faster speeds than in the cutting-tools hitherto used.

My invention is not confined to tools for sawing or slotting metal, since it will be evident that by securing a series of cutters, such as shown in Fig. 1, side by side upon a shaft, with their teeth disposed in diagonal rows, as shown in Fig. 4, an effective surface-milling tool will be produced. In this case the teeth do not project laterally beyond the face of the bodies until after they project beyond the periphery of the same, thus permitting the cutters to fit snugly together upon the shaft.

My invention is also applicable to annular ring tools for cutting, boring, or trepanning, an instance of such tool being shown in Figs. 5 and 6, in which 3ª represents an annular cutter-stock having teeth 1 set in slots 2 in the inner and outer faces of the ring, these teeth having all the characteristics as to construction and location of the teeth shown in Figs. 1, 2, and 3, with the exception that their outer ends are not in advance of their inner ends in the direction of rotation of the teeth, such disposition of the teeth not being necessary in a tool of this class.

For convenience and to avoid repetitions I have in the claims used the word "body" to designate the blade, stock, or other element which carries the cutting bits or teeth.

Having thus described my invention, I claim and desire to secure by Letters Patent—

1. A rotary cutter having a body with a series of grooves formed in the face of the same and of less depth than the thickness of the body, and a plurality of inserted teeth seated in said grooves, the latter being inclined in such direction in respect to the body as to impart a clearance to the teeth, substantially as specified.

2. A rotary cutter having in the face of the cutter-body undercut grooves of less depth than the thickness of the cutter-body, and teeth seated in said grooves, the latter being inclined rearwardly at such an angle to the radial lines of the body of the tool that the thrust of the work upon the tool during its cutting operation will hold the teeth in place, and being otherwise inclined in such direction in respect to the body as to impart a clearance to the teeth, substantially as specified.

3. A rotary cutter having undercut grooves and teeth seated therein, said teeth being composed of flat bars of self-hardening steel, and the grooves being of less depth than the thickness of the body of the cutter and inclined rearwardly at such an angle to the radial lines of said body that the thrust of the work upon the teeth during the cutting operation will hold said teeth in place, substantially as specified.

4. A rotary cutter having undercut grooves and teeth set therein, said teeth being composed of flat bars of self-hardening steel and said grooves being of less depth than the thickness of the cutter-body and inclined rearwardly at such an angle to the radial lines of the said body that the thrust of the work upon the teeth during the cutting operation will hold said teeth in place, and being otherwise inclined in such direction in respect to the body of the tool as to impart a clearance to the teeth, substantially as specified.

In testimony whereof I have signed my name to this specification in the presence of two subscribing witnesses.

ADAM TINDEL.

Witnesses:
F. E. BECHTOLD,
JOS. H. KLEIN.